US007339338B2

(12) United States Patent
Theile et al.

(10) Patent No.: US 7,339,338 B2
(45) Date of Patent: Mar. 4, 2008

(54) METHOD FOR OPERATING A DOOR AND A DOOR DRIVE FOR CARRYING OUT THIS METHOD

(75) Inventors: Ulrich Theile, Hagen (DE); Christian Dietz, Wipperfürth (DE)

(73) Assignee: Novoferm Tormatic GmbH, Dortmund (DE)

( * ) Notice: Subject to any disclaimer, the term of this patent is extended or adjusted under 35 U.S.C. 154(b) by 38 days.

(21) Appl. No.: 11/332,405

(22) Filed: Jan. 13, 2006

(65) Prior Publication Data

US 2006/0158144 A1 Jul. 20, 2006

(30) Foreign Application Priority Data

Jan. 14, 2005 (DE) ...................... 10 2005 002 071
Aug. 18, 2005 (DE) ...................... 10 2005 039 533

(51) Int. Cl.
*H02P 1/04* (2006.01)

(52) U.S. Cl. ......................... 318/466; 318/280; 49/139

(58) Field of Classification Search ................ 318/466, 318/280; 49/139
See application file for complete search history.

(56) References Cited

U.S. PATENT DOCUMENTS 5,039,925 A * 8/1991 Schap ........................ 318/282
5,222,327 A * 6/1993 Fellows et al. ............... 49/139
5,278,480 A * 1/1994 Murray ....................... 318/626
5,590,547 A * 1/1997 Conzelmann ............. 66/132 R
5,729,101 A * 3/1998 Richmond et al. .......... 318/282
5,789,887 A * 8/1998 Elischewski ................ 318/468
5,841,253 A * 11/1998 Fitzgibbon et al. ......... 318/280
5,857,061 A * 1/1999 Chang et al. ............... 388/829
5,918,418 A * 7/1999 Richmond et al. ............ 49/139
5,942,867 A * 8/1999 Richmond .................. 318/280

(Continued)

FOREIGN PATENT DOCUMENTS

EP 1 046 775 10/2000

(Continued)

*Primary Examiner*—Lincoln Donovan
*Assistant Examiner*—Antony Paul
(74) *Attorney, Agent, or Firm*—Cohen Pontani Lieberman & Pavane LLP

(57) ABSTRACT

A door, especially a sectional door, is operated with the use of a drive unit with a drive gear, a clutch, and a position-detecting unit. The position-detecting unit detects the direction of rotation of the drive gear, detects the number of revolutions of the drive gear by pulses, and stores the pulses, taking the direction of rotation into consideration, in a nonvolatile memory. A data-processing unit is present in which different variable sequence programs are stored, which include not only safety-relevant programs but also a learning program. Reference values are determined by the position-detecting unit for a variable open position of the door, which position can be set as desired, and for a completely open position, which is limited by a stop, as well as for a closed position of the door are stored in a nonvolatile memory and are processed during automatic travel of the door. A door drive consists essentially of a drive unit with a drive gear and a running rail, wherein the drive unit can be moved along the running rail by a motor. The position of the drive unit is detected by a position-detecting unit and stored in a nonvolatile memory, and the drive unit and the drive gear are equipped with a clutch with a status monitor.

18 Claims, 3 Drawing Sheets

U.S. PATENT DOCUMENTS

| | | | | |
|---|---|---|---|---|
| 6,198,242 | B1 * | 3/2001 | Yokomori et al. | 318/445 |
| 6,430,875 | B1 * | 8/2002 | Clark et al. | 49/360 |
| 6,435,600 | B1 * | 8/2002 | Long et al. | 296/155 |
| 6,614,200 | B2 * | 9/2003 | Fowler et al. | 318/445 |
| 6,879,122 | B1 * | 4/2005 | Stewart et al. | 318/280 |
| 7,061,196 | B2 * | 6/2006 | Noro et al. | 318/443 |
| 2003/0025470 | A1 * | 2/2003 | Fitzgibbon et al. | 318/66 |
| 2004/0061462 | A1 * | 4/2004 | Bent et al. | 318/280 |
| 2004/0064287 | A1 * | 4/2004 | Fitzgibbon | 702/145 |
| 2005/0067990 | A1 * | 3/2005 | Matsui et al. | 318/478 |
| 2005/0082998 | A1 * | 4/2005 | Gregori et al. | 318/280 |

FOREIGN PATENT DOCUMENTS

| | | |
|---|---|---|
| EP | 1 325 997 | 7/2003 |

* cited by examiner

METHOD FOR OPERATING A DOOR AND A DOOR DRIVE FOR CARRYING OUT THIS METHOD

BACKGROUND OF THE INVENTION

1. Field of the Invention

The invention concerns a method for the automatic and manual operation of a door, especially a sectional door, a sliding door, or the like, and a door drive for carrying out this method.

2. Description of the Related Art

EP 1 046 775 A2 describes a drive for doors, which has a drive shaft driven by a motor-transmission unit with a gear for power transmission and a position-detecting unit in the form of an incremental transmitter set on the motor-transmission unit. The position-detecting unit detects the direction of rotation of the drive shaft and detects and stores the number of its revolutions. The position-detecting unit allows continuous detection of the position of the door leaf over its entire opening distance. Separate limit switches for shutting off the door drive in the closed position and in the open position are unnecessary. In addition, there is the possibility of controlling the speed of the door as a function of the given position of the door leaf. There is no provision for manual operation of the door.

SUMMARY OF THE INVENTION

In an emergency situation, for example, in the event of a malfunction of the door drive or in the event of a power outage, it must be possible to open the door leaf by hand. Following a manual operation, it should be possible to resume automatic operation in a simple way and independently of the given position of the door leaf. With this background in mind, an object of the invention is to specify a method for operating a door, especially a sectional door, a sliding door, or the like, that allows a simple change between automatic operation and manual operation of the door. A further objective is to specify a door drive for carrying out this method, which is simple to operate and inexpensive to produce.

In accordance with the invention, a method is proposed for the automatic and manual operation of a door, especially a sectional door, or the like, essentially with the use of a drive unit with a drive gear, a clutch, and a position-detecting unit, which detects the direction of rotation of the drive gear, detects the number of revolutions of the drive gear by pulses, and stores the pulses, taking the direction of rotation into consideration, in a nonvolatile memory. A data-processing unit is present in which different variable sequence programs are stored, which include not only safety-relevant programs but also a learning program, such that the reference values determined by the position-detecting unit for a variable open position of the door, which can be set as desired, and for an absolute open position, which is limited by a stop, as well as for a closed position of the door are stored in a nonvolatile memory and are processed during automatic travel of the door.

The learning run is always necessary when a disconnection of the drive unit from the drive gear was carried out. During the learning run, the door drive is manually controlled by, for example, operation of up/down buttons. The door leaf is first moved out of the door leaf closed position into an open position, which can be set as desired by the user. By this operation of a button or the like, a reference value associated with this position of the door leaf is assigned to the position-detecting unit and stored in a nonvolatile memory or counter. In the learning mode, the door leaf is then moved into the door leaf closed position, and the value is transmitted to the position-detecting unit; the position-detecting unit detects the distance that has been traveled and stores the counter interval as a reference value in a nonvolatile memory. The door leaf is then also moved in the learning run by further operation of the door drive in the opening direction until the previously established open position has been reached. The drive then further opens the door, during which the system itself seeks the terminal open position, for example, by measurement of the current consumption (stop). In this regard, the terminal open position can be the end of a running rail. An associated reference value is also assigned to the position-detecting unit for the terminal open position and stored. The door leaf is then automatically moved back into the open position by the door drive, and the learning run for determining the door terminal positions, door closed position, door open position, and terminal open position or the like is completed.

In the subsequent automatic operation, the door drive is started with a start command and stops opening and closing movements of the door when the signal value detected by the position-detecting device corresponds to the reference values that are associated with the open or closed position of the door. At all times and in every position of the door leaf, it is possible to switch over to manual operation. To this end, a clutch is actuated, which kinematically disconnects the drive shaft from the drive unit. This clutch can be manually or remotely actuated. To restart the automatic operation, the drive shaft is reconnected by engaging the clutch. As soon as the kinematic connection between the drive shaft and the drive unit has been reestablished, the drive unit moves the door into the terminal open position, and the reference value associated with this position is adopted as the current value of the position-detecting unit. The door leaf then moves automatically back into the open position and is again positioned for the subsequent automatic operation.

In accordance with a preferred embodiment of the invention, the position of the clutch is monitored by a status monitor. The clutch status monitor can be used to shut off the door drive automatically when the clutch is disengaged, to switch the door drive back to operating readiness automatically when the clutch is engaged, and to store a suitable flag in order to move to the terminal open position after the next start command. (The control can likewise be set up in such a way that when the clutch is engaged, the drive system automatically starts and undertakes a new learning run into the terminal open position.)

In the method described above, it is advantageous to measure the current consumption of the door drive and to shut off the drive when a limit is exceeded.

The method described above can also be realized by monitoring the rotational speed. The method is also especially suitable for driving a sliding door. In this case, in contrast to the sectional door, the installation of the drive is stationary.

An additional object of the invention is a door drive for carrying out the method described above.

A door drive of this type for carrying out the method described above includes a drive unit, which consists of a drive gear, which can be moved in or on a stationary running rail and is driven by a motor or can be moved along the running rail by a linkage, wherein the position of the drive unit is detected by a position-detecting unit, stored in a nonvolatile memory, and processed in the drive unit, which contains a data-processing unit with various stored programs, and wherein a clutch with a status monitor is present between the motor and the drive gear. In a first shift position, the clutch connects the drive gear with the drive unit, and in a second shift position, the drive gear is kinematically disconnected from the drive unit. This is preferably effected by a shift lever. In this regard, a monitoring unit for detecting the shift position of the clutch is assigned to the shift lever, and its signals are supplied to the drive unit.

Since the drive unit contains an electronic data-processing system for carrying out the method described above, various settings for the learning run, manual operation, and safety circuits, etc, are present there.

The signal of the monitoring unit assigned to the clutch can also be indicated as an optical and/or acoustic signal, which notifies the user that the door drive is locked, and in this state the door cannot be opened, for example, from the outside by an unauthorized person. The shift lever of the clutch can be operated from the inside as a manual lever or automatically. For example, the shift lever can be additionally connected to the Bowden cable, which connects the shift lever with a mechanical locking mechanism of the door leaf, so that emergency unlocking is also possible from the outside.

It is advantageous for the monitoring unit to have a switching element as a status monitor, whose operating position detects the position of the clutch. In a preferred design, the status monitor has a spring-loaded ratchet lever, which allows a shift movement of the shift lever from a first to a second shift position to disengage the clutch and locks the shift lever in the second shift position, and the switching element detects the position of the ratchet lever. In this regard, the switching element can be placed, for example, on a shaft extension of the ratchet lever, which can extend into the region of the position-detecting unit. It is advantageous for the shift lever to be acted upon by a restoring device, for example, a compression spring, and to automatically return to the first shift position when the ratchet lever, which locks the shift lever in the second shift position, is set back again. It is advantageous for the ratchet lever to be provided with an actuating arm for setting it back.

The position-detecting unit is preferably an incremental transmitter.

In accordance with a preferred circuit arrangement, the switching element is connected within a current path with a light barrier of the incremental transmitter and with an input of a comparator.

Especially for use in sectional doors and tip-up doors, the door drive can be designed to move. In this connection, the drive unit of the door drive is mounted on a track device, which is directly attached to the door leaf or is connected with it by a coupling rod, and can be moved along a guide rail. A roller of the track device that engages the guide rail drives the drive unit. The roller of the track device can be designed as a pinion, which engages a toothed profile of the guide rail or a toothed belt stretched in the guide rail.

Alternatively, the drive unit can be realized as a stationary unit. In the case of stationary installation, the arrangement of the drive unit is fixed, and a traction mechanism in the form of a cable, a chain, or a toothed belt attached to the door leaf is guided around the drive gear. Stationary installation is advantageous, for example, in the case of a sliding door.

The invention is explained below with reference to a specific embodiment, which is schematically illustrated in the drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
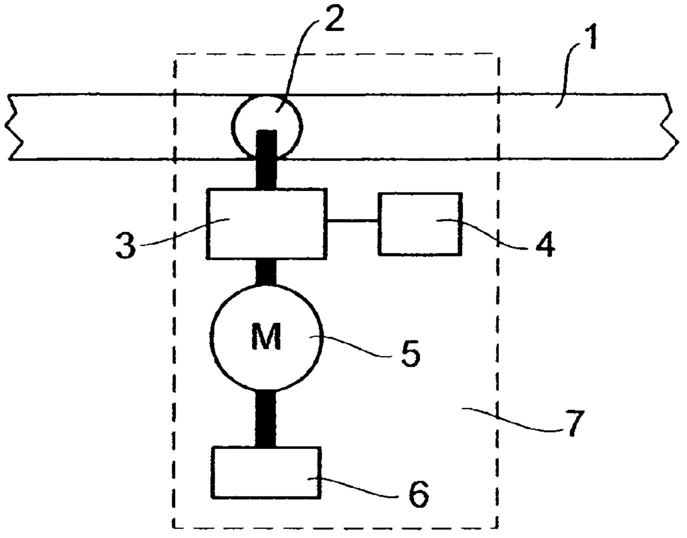
FIG. 1 is a schematic view of a door drive that can be moved along a guide rail.

The door drive shown in FIG. 1 can be moved along a running rail 1 and has a drive gear 2 for power transmission, which is driven by a drive unit 7, and a clutch 3 between the motor 5 and the drive gear 2. A status monitor 4 is assigned to the clutch 3. The status monitor can detect the position of the clutch. A position-detecting unit 6 includes an incremental transmitter and an electronic control unit for the processing and storage of signals. It detects the direction of rotation of the drive shaft and thus the drive gear 2, detects the number of revolutions of the drive gear 2 by pulses, and stores this number in a nonvolatile memory with a positive or negative sign, depending on the direction of rotation.

Figure 3:
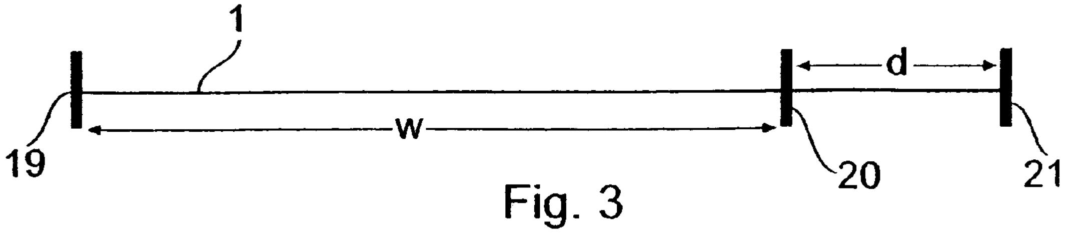
FIG. 3 is a representation of the total travel distance of the door drive.

In the specific embodiment illustrated in FIG. 3, the door drive is connected to a door leaf either directly or by a coupling rod and can be moved with the door leaf along the running rail 1 between a door leaf "closed position" 19, an "open position" 20 of the door, which can be set as desired by the user, and a "completely open" terminal open position 21, which is limited by a stop. During a learning run, reference values are assigned to the position-detecting unit 6 for the specified positions 19, 20, 21 and stored. During subsequent automatic operation, the door drive stops the opening and closing movement of the door when the value detected by the position-detecting unit 6 corresponds to the reference values that are assigned to the respective closed and open positions 19, 20 of the door.

Disconnection of the motor 5 from the drive gear 2 and thus manual operation of the door is also possible at any time. For this mode of operation, the drive gear 2 is kinematically disconnected from the drive unit 7 by operation of the clutch 3. As a result of a signal of the assigned status monitor 4, the door drive is automatically shut off when the clutch 3 is disengaged. To return to automatic operation, the drive gear 2 is reconnected with the drive unit 7 by engagement of the clutch 3. As a result of a signal supplied by the status monitor 4, the door drive is automatically switched back to operating readiness. The door is moved into the terminal open position 21 by a start command or automatically. In this position, the associated reference value is adopted as the current signal value of the position-detecting unit 6; the door is then moved to the "open position" 20.

In the method that has been described, the current consumption of the door drive is preferably measured, and the drive is shut off when selected limits are exceeded.

Figure 4:
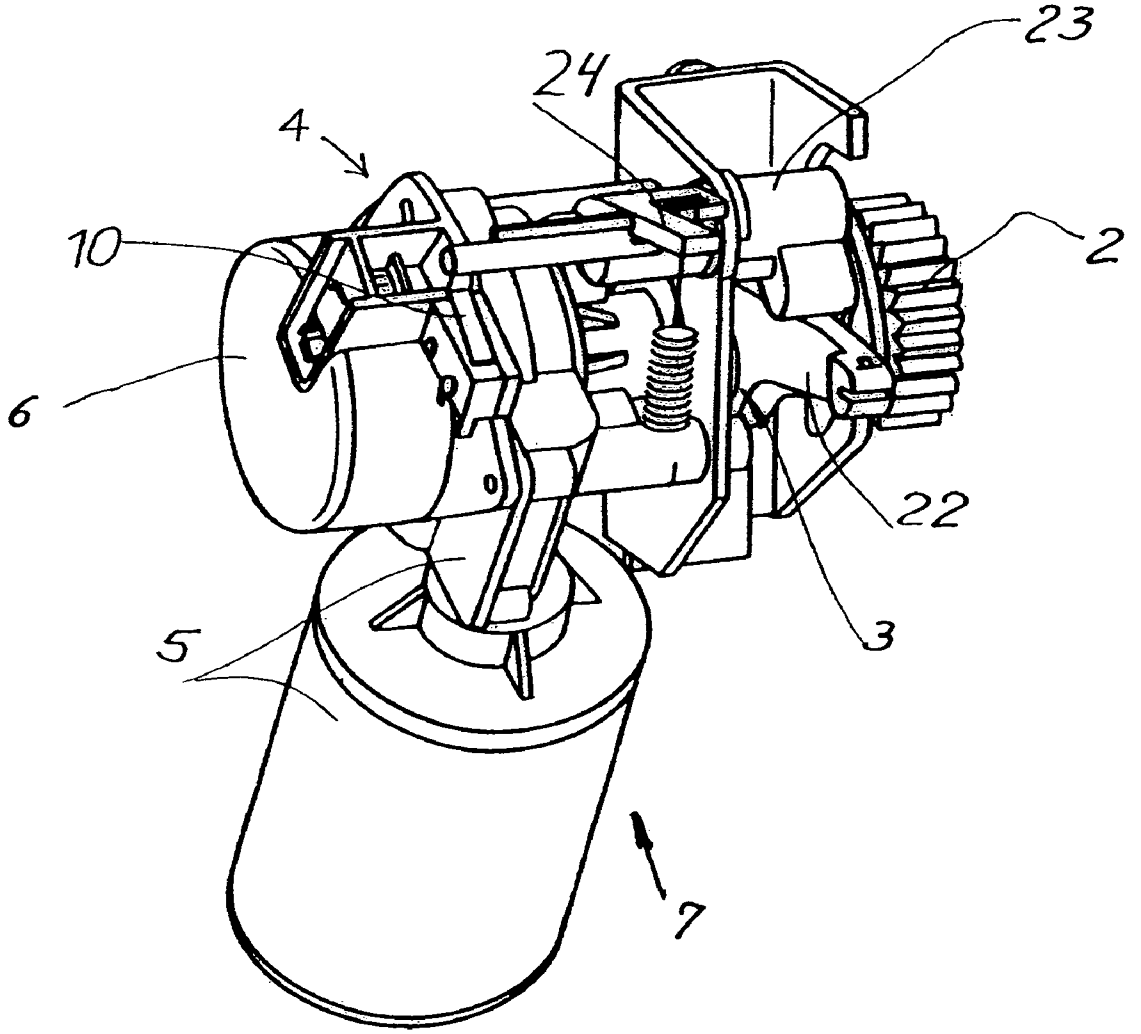
FIG. 4 shows a physical embodiment of the door drive illustrated in FIG. 1.

FIG. 4 shows a design of a door drive. The basic design of the door drive includes the drive unit 7, a drive shaft with a drive gear 2 for power transmission, which is driven by the drive unit 7, and a position-detecting unit 6, which detects the direction of rotation of the drive shaft and detects the number of revolutions of the drive shaft and thus of the drive gear 2. The position-detecting unit 6 and the drive unit 7 are connected to a control unit (which may be part of the position detecting unit or separate) for processing the signals supplied by the position-detecting device 6 and for controlling the drive unit 7. The clutch 3 is installed between the drive unit 7 and the drive gear 2. In a first shift position, the clutch 3 connects the drive gear 2 with the drive unit 7, and in a second shift position, the drive gear 2 is kinematically disconnected from the drive unit 7, e.g., with a shift lever 22. A monitoring unit 4 with a switching element 10 for detecting the shift position of the clutch 3 is assigned to the shift lever 22, and its signals are supplied to the control unit. The shift lever 22 can be operated manually or automatically. A Bowden cable can also be connected to the shift lever 22. It connects the shift lever 22 with a locking mechanism (not shown) of the door leaf.

Figure 2:
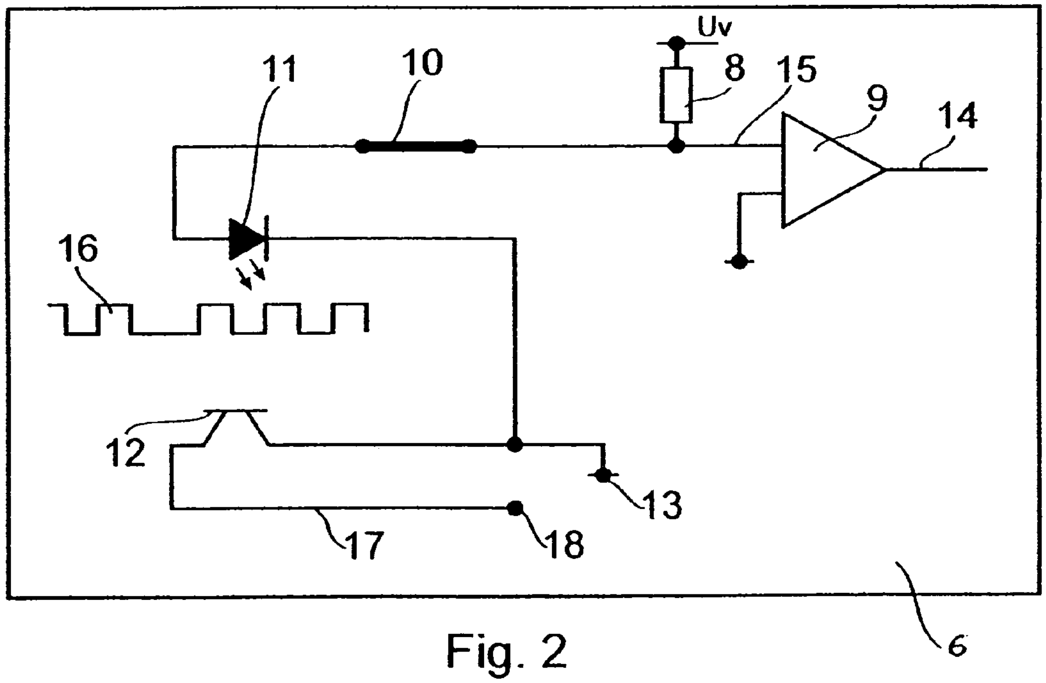
FIG. 2 shows a simplified circuit arrangement for the position detecting unit illustrated in FIG. 1.

The drawing in FIG. 4 shows that in this embodiment the monitoring unit 4 has a spring-loaded ratchet lever 23, which allows a shifting movement of the shift lever 22 from a first shift position to a second shift position to disengage the clutch 3 and, in the second shift position, locks the shift lever 22. The shift lever 22 is acted upon by a restoring device (not shown), e.g., a compression spring, and under the effect of the restoring device always assumes the position shown in FIG. 5 when the ratchet lever 23 is set back. The ratchet lever 23 is provided with an actuating arm 24 for setting it back. In the illustrated embodiment, the switching element 10 that belongs to the monitoring unit 4 is placed under a shaft extension of the ratchet lever 23, which extends into the region of the position-detecting unit 6. The switch 10 can therefore be actuated when shift lever 22 pivots downward The switching element 10 can be integrated in the position detecting unit, for example, in accordance with the circuit arrangement shown in FIG. 2.

The greatly simplified circuit arrangement shows the position-detecting unit 6 with the associated light source 11, light barrier 16, and transistor 12. It also shows the switching element 10, which is connected within a current path with a light source 11 and with an input of a comparator 9 via a connection 15. The light barrier 16 may be a wheel which rotates with the drive gear 2 to interrupt the light and create a pulsed signal at the transistor 12. The light barrier 16 therefore serves as an information transmitter. Also shown are a series resistor 8, a ground connection 13, and a signal output 18, which is connected with the output of the transistor 12 by a connection 17.

Figure 5:
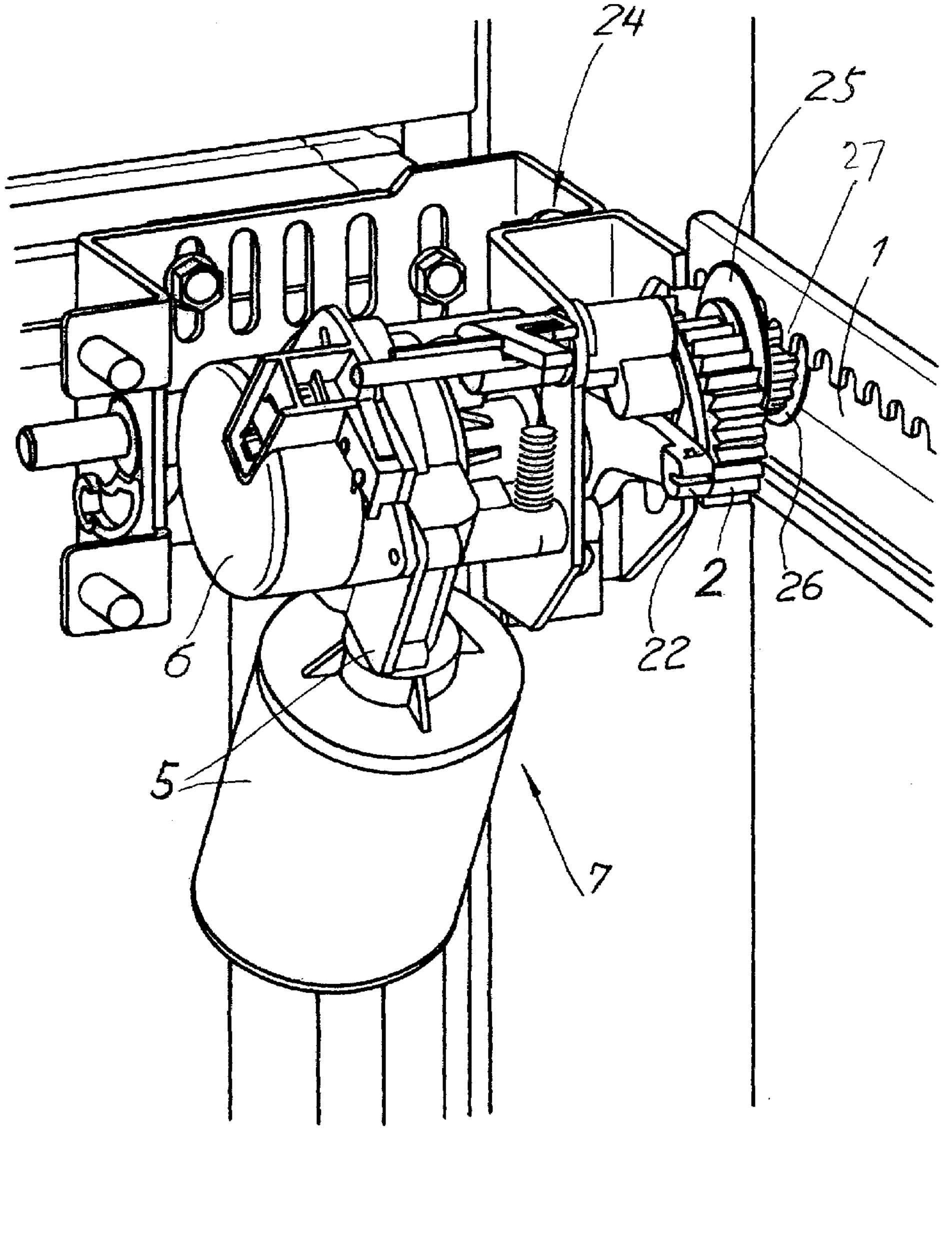
FIG. 5 shows the installation of the door drive illustrated in FIG. 4 on the inside of a door leaf.

In the embodiment shown in FIG. 5, the drive unit 7 is mounted on a track device 25, which is directly attached to the door leaf, and can be moved along the guide rail 1. The drive unit 7 drives a roller 26 of the track device 25, and the roller 26 engages the guide rail 1. In the illustrated embodiment, the roller 26 of the track device 25 is designed as a pinion, which mates with a toothed belt stretched in the guide rail 1 or—as shown in the illustrated embodiment—with a toothed rack 27 formed on the guide rail 1. A more complete description of the drive unit can be found in application Ser. No. 11/332,404.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a door which is opened and closed by a drive unit having a drive gear and a clutch, said method comprising:

generating pulses as the drive gear rotates;

storing the pulses in a nonvolatile memory having a data processing unit in which variable sequence programs are stored, the programs including a learning program;

determining the direction of rotation and the number of revolutions of the drive gear based on the pulses;

setting a variable open position of the door;

determining reference values for the variable open position, a terminal open position, and a closed position of the door during a learning run using the learning program;

storing the reference values in the nonvolatile memory; and controlling automatic operation of the door based on the direction of rotation of the drive gear, the number of revolutions of the drive gear, and the reference values.

2. The method of claim 1, wherein the learning run comprises the following steps:

the door travels a distance "w" from the variable open position to the closed position;

the door travels a distance "w+d" from the closed position to the terminal open position; and the door travels a distance "d" back to the variable open position.

3. The method of claim 1, wherein, during automatic operation of the door, opening and closing movements of the door are stopped when the direction of rotation and the number of revolutions of the drive gear correspond to the reference value associated with the respective variable open position or the closed position.

4. The method of claim 1, wherein, after the clutch has been disengaged and re-engaged, the drive unit carries out a new learning run before returning to automatic operation.

5. The method of claim 1, further comprising monitoring the position of the clutch;

automatically turning off the drive unit when the clutch is disengaged; and automatically turning on the drive unit when the clutch is engaged.

6. A door drive for automatic operation of a door, the door drive comprising a drive unit, the drive unit comprising:

a drive gear which can be moved along a running rail;

a motor driving the drive gear;

a clutch between the motor and the drive gear;

a status monitor comprising a switch for indicating the position of the clutch;

a position detecting unit which detects the position of the drive unit;

a non-volatile memory for storing the position of the drive unit; and a data processing unit with a learning program for determining reference values for a variable open position, a terminal open position, and a closed position of the door, and for controlling automatic operation of the door based on the position of the drive gear and the reference values.

7. The door drive of claim 6, wherein the position detecting unit comprises an information transmitter.

8. The door drive of claim 7, wherein the information transmitter comprises a light source, the switch being located in a current path to the light source.

9. The door drive of claim 8, wherein the drive unit further comprises a comparator, the switch being connected to an input of comparator.

10. The door drive of claim 6, wherein, when the status monitor detects that the clutch is disengaged, the motor is disconnected from the drive gear when the clutch is disengaged.

11. The door drive of claim 6, wherein, when the clutch is disengaged, the drive gear can be moved manually along the running rail, and the clutch can be re-engaged at any desired position of the drive unit.

12. The door drive of claim 6, wherein the switch is actuated when the clutch is disengaged.

13. The door drive of claim 8, wherein the switch is actuated when the clutch is disengaged, and the information transmitter and the motor are shut off when the switch is actuated.

14. The door drive of claim 1, further comprising a running rail along which the drive gear moves, the running rail having a length equal to the distance between the closed position and the terminal open position.

15. The door drive of claim 6, further comprising a shift lever for manually shifting the clutch, the status monitor being connected to the shift lever.

16. The door drive of claim 15, wherein the status monitor comprises a spring loaded ratchet lever which allows the shift lever to shift from a first shift position to a second shift position to disengage the clutch, and which locks the shift lever in the second shift position, wherein the switch detects the position of the ratchet lever.

17. The door drive of claim 16, wherein the status monitor further comprises an actuating arm connected to the ratchet lever for resetting the ratchet lever.

18. The door drive of claim 6, further comprising a traction unit which is one of a cable, a chain, or a toothed belt attached to door, the drive unit being installed as a stationary unit, the drive gear engaging the traction unit.

* * * * *